PERIODIC SIGNAL SELECTOR AND BLANKING GENERATOR SYSTEM

Filed Oct. 24, 1957

2 Sheets-Sheet 1

INVENTOR.
NICHOLAS T. SIMOPOULOS
BY Tom Walker
ATTORNEY

PERIODIC SIGNAL SELECTOR AND BLANKING GENERATOR SYSTEM

Filed Oct. 24, 1957 2 Sheets-Sheet 2

INVENTOR.
NICHOLAS T. SIMOPOULOS

BY Tom Walker

ATTORNEY

United States Patent Office 2,959,737

Patented Nov. 8, 1960

2,959,737

PERIODIC SIGNAL SELECTOR AND BLANKING GENERATOR SYSTEM

Nicholas T. Simopoulos, 1912 Echo Woods Court, Kettering 9, Ohio

Filed Oct. 24, 1957, Ser. No. 692,144

9 Claims. (Cl. 328—110)

This invention relates to a periodic signal selector and a blanking generator system incorporating same whereby pulse signals of a period nature may be selected for further processing and utilized for control purposes.

Signal selectors of the type hereinafter disclosed may be used for various purposes such as the synchronization of other circuit components and systems, the selection of particular signals in order to prevent same from affecting certain selected internal and external circuits, relative amplitude comparison of certain selected signals, signal selecting components in beacon transponder circuitry and many others including data selection for the purpose of random access in computing systems.

For purposes of clarity, the periodic signal selector will be described in conjunction with a blanking generator system for aircraft for the purpose of preventing unwanted signals from external equipment circuitry from affecting the indicating equipment.

It is, therefore, an object of this invention to provide a periodic signal selector which will generate a synchronizing signal for other circuit components.

Another object of this invention is to provide a periodic signal selector for selecting signals that are to be blanked or prevented from passing to certain other receptive circuits.

Another object of this invention is to provide a periodic signal selector having an error detector for determining coincidence between periodic pulse signals.

Still another object of this invention is to provide a periodic signal selector having a controller for the purpose of bringing a selecting signal into coincidence with an incoming pulse train.

Yet another object of this invention is to provide a blanking generator system for aircraft instruments incorporating a periodic signal selector of the type hereinafter described.

*Periodic signal selector*

Figure 1:
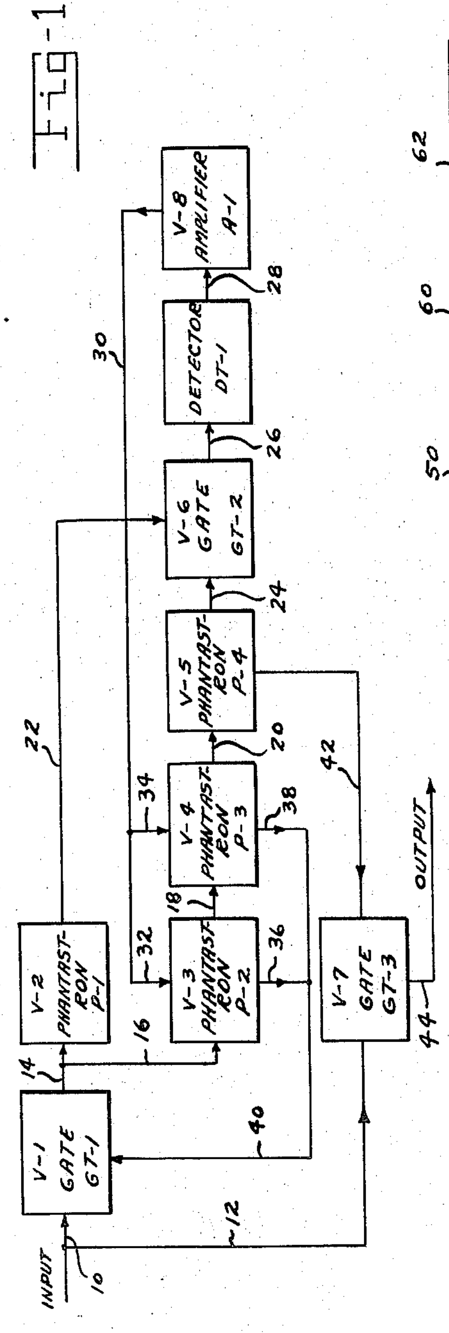
Fig. 1 is a block diagram of the periodic signal selector.
Figure 2:
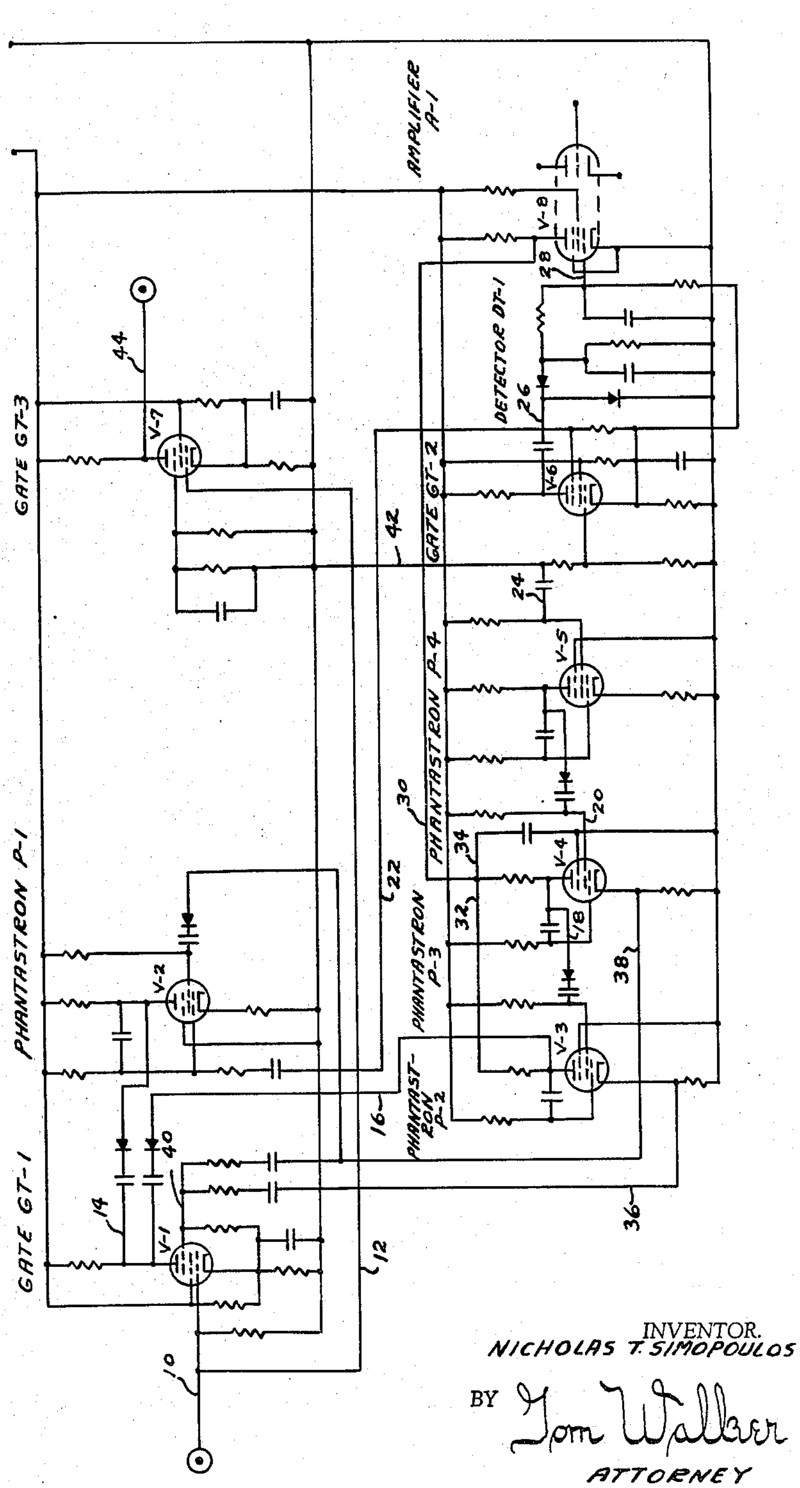
Fig. 2 is a complete schematic of the block diagram shown in Fig. 1.

Referring to the drawings in more detail, see Figs. 1 and 2, a pulse signal input is fed through a line 10 into an electronic control tube V–1 in an input gating circuit component GT–1. The input signal, at the same time, is fed through a line 12 to an electron control tube V–7 in an output gating circuit GT–3.

The output of gate GT–1 is fed through a line 14 to an electron tube V–2 in a selecting multivibrator or phantastron type circuit P–1. A branch line 16 extends from line 14 to an electron tube V–3 in a monostable multivibrator or phantastron circuit P–2.

An output of phantastron P–2 is coupled through a line 18 to a control tube V–4 in phantastron circuit P–3 which in turn has an output terminal connected through line 20 to a control tube V–5 in phantastron circuit P–4 which is a selecting pulse generator.

The outputs of phantastrons P–1 and P–4 are fed into an error gate GT–2 through a control tube V–6 through lines 22 and 24 respectively.

The output of the error gate is fed through line 26 to an error signal detector DT–1 which, in turn, is connected at its output via line 28 to the control grid of a control tube V–8 in a feedback amplifier circuit A–1.

A feedback loop is completed from the output side of feedback amplifier A–1 through line 30 to the plate circuits of electron tubes V–3 and V–4, phantastrons P–2 and P–3 via branch lines 32 and 24, respectively.

In addition, a negative pulse feedback loop is completed from phantastrons P–2 and P–3 through branch lines 36 and 38 respectively, and a main feedback line 40 to a suitable control grid in control tube V–1 for the purpose of controlling gate G–1 and preventing phantastron P–2 from responding to input pulses within the time interval that the phantastrons P–2 and P–3 are operating.

The phantastron, or selecting pulse generator, P–4 has a selecting pulse output connected to control tube V–7 in output gate GT–3 through a line 42 to complete the interconnection of the above described circuit components.

The output signal of the periodic signal selector is taken from the output gate GT–3 through a line 44 to the system to be controlled thereby.

Referring to Fig. 1, the operation of the periodic signal selector is as follows:

An incoming pulse is applied through line 10 and control tube V–1 to the input gate GT–1. The output pulse passing gate GT–1 is fed through lines 14 and 16 to trigger the phantastrons P–1 and P–2, respectively.

At the end of its period of operation, the phantastron P–2 triggers the phantastron P–3 via line 18. Phantastron P–3, in turn, at the end of its period of operation triggers phantastron P–4 to the "on" state through line 20. During their period of operation, both phantastrons P–2 and P–3 feed negative pulses through branch lines 36 and 38, respectively, and through line 40 to the input gate GT–1 to prevent incoming pulses from further triggering phantastron P–2 until the beginning of the next cycle of operation.

The output pulses generated by phantastrons P–1 and P–4 are fed through lines 22 and 24, respectively, to the input side of the error gate GT–2. The output of the error gate GT–2 is applied through line 26 to the error detector DT–1 which generates a particular error signal depending on conditions to be hereinafter described.

The output error signal of the error detector DT–1 is fed through line 28 to the input side of the feedback amplifier A–1 which generats a corresponding feedback signal. The feedback signal is fed through line 30 to branch lines 32 and 34 in the plate circuits of control tubes V–3 and V–4 in phantastrons P–2 and P–3, respectively, to vary the plate potentials thereof.

Since the pulse widths of the phantastrons P–2 and P–3 are functions of their controlled plate potentials, the plate potential is varied by the feedback signal in order to bring the output pulses of phantastrons P–1 and P–4 into coincidence.

Thus, by adjusting the delay time formed by phantastrons P–2 and P–3, the pulse at the input of the periodic signal selector will be coincident with the selecting pulse generated by the phantastron P–4 if the input signal is periodic and steady in nature. Both of these pulses are then fed through control tube V–7 via lines 12 and 42 for the input and selecting pulses, respectively, to trigger the output gate GT–3 and thereby generate an output pulse in line 44.

In order to clarify the relationship between the error gate GT–2, detector DT–1 and feedback amplifier A–1, the derivation of the proper error signal is accomplished as follows:

At the outset, a signal is applied through the input gate GT–1 which triggers the phantastrons P–1, P–2, P–3 and P–4 in sequence, with phantastrons P–1 and P–2 being triggered in unison.

It is now desired, that the selecting pulse generated by the phantastron or selecting pulse generator P–4 will occur in unison with the input signal pulse if the input signal is a periodic train of pulses. Error gate GT–2 is so arranged that it will generate an output pulse of sufficient magnitude to produce a large error signal at the output terminals of the detector DT–1 if the pulse outputs of phantastrons P–1 and P–4 do not occur within the time interval determined by the resolution time of the selecting pulse.

The error signal from the detector DT–1 is amplified and fed back by feedback amplifier A–1 to the plate circuits of phantastrons P–2 and P–3 whereby the pulse widths of phantastrons P–2 and P–3 are varied to change the operating period of the phantastron delay time and bring the input and selecting pulses into synchronism. When the input and selecting pulses are coincident only a very small error signal is generated by the detector DT–1.

The selecting pulse generated by the phantastron P–4 controls output gate GT–3 and prevents any other interconnected periodic signal selectors from acting on the same periodic pulse train.

For the purpose of clarity, a blanking generator system will now be described which incorporates the above disclosed periodic signal selector.

*Blanking generator system*

Figure 3:
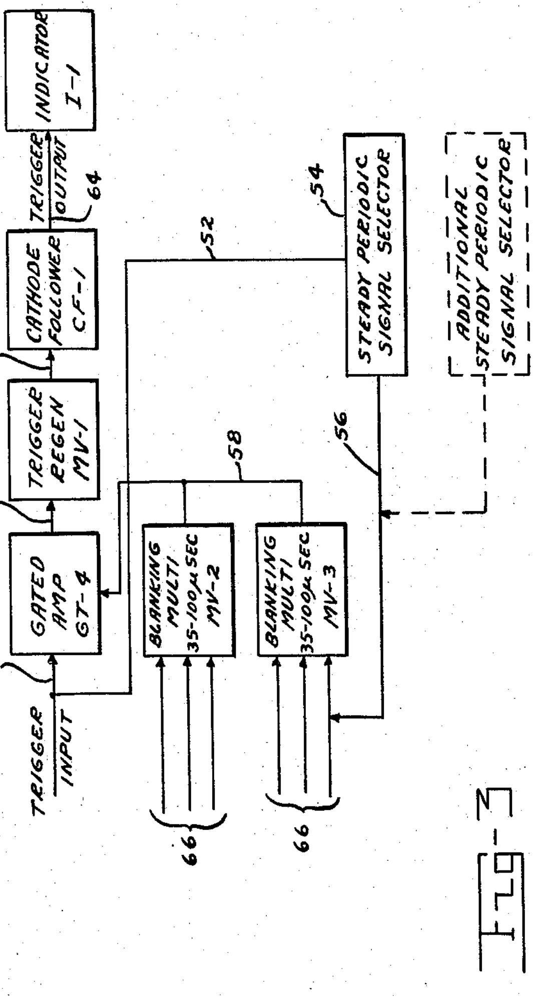
Fig. 3 is a block diagram of a blanking generator system incorporating the periodic signal selector shown in Fig. 1.

Referring to Fig. 3, a trigger pulse input is applied through a line 50 to a gated input amplifier stage GT–4 and simultaneously through a line 52 to the periodic signal selector 54. The periodic signal selector 54 is shown in detail in Figs. 1 and 2. A single block representation is used here for the purpose of simplicity.

The output of the periodic signal selector 54 is fed into the inputs of blanking multivibrators MV–2 or MV–3 through line 56. The blanking multivibrators are interconnected by a line 58 which is in turn connected to a control grid in the gated input amplifier stage GT–4. Thus a steady periodic signal blanking loop is completed between the input of the amplifier GT–4, line 52, steady periodic signal selector 54, line 56, blanking multivibrators MV–2 or MV–3, line 58 and back to the gated input amplifier stage GT–4.

The output of the gated input amplifier stage GT–4 is connected through a line 60 to a trigger signal regenerating multivibrator MV–1 which in turn has its output fed through a line 62 to a cathode follower CF–1. The output pulse of the cathode follower is fed through a line 64 to the input terminals of the primary equipment indicator I–1.

Also fed to the inputs of the blanking multivibrators MV–2 and MV–3 through lines 66 are a plurality of video pulse inputs from the video equipment modulator or synchronizer which are to be used as trigger pulses for the purpose of blanking out spurious echoes from interfering equipments.

In operation, the incoming trigger signal is fed into the gated input amplifier stage GT–4 through line 50 and into the steady periodic signal selector 54 through line 52. If the trigger input signal is not steady in nature, the signal is amplified by the input stage GT–4 and fed through line 60 to the trigger signal regenerating multivibrator MV–1 which regenerates the trigger input signal and feeds it through line 62, cathode follower CF–1 and line 64 to the primary equipment indicator I–1.

When it is desired to blank a particular equipment from the indicating equipment, a video trigger pulse is fed through one of the lines 66 from the equipment modulator or synchronizer to the blanking multivibrators MV–2 and MV–3.

The video trigger pulse causes the blanking multivibrators to generate a blanking output pulse to be fed through line 58 and prevent the gated amplifier GT–4 from amplifying the trigger input signal for a period in the neighborhood of 35 to 100 microseconds, the blanking time being dependent on the number of spurious echoes generated by the interfering equipments. Since the blanked gated amplifier does not allow the trigger input pulse to be regenerated, there will be no resulting signal to be observed on the primary equipment indicator. Thus, the interfering equipment has been blanked from the indicator system.

If the trigger input signal is of a steady periodic nature, the resulting video pulse output of the steady periodic signal selector is applied to the input of the blanking multivibrators MV–2 or MV–3 through line 56 whereby the gated input amplifier stage GT–4 is prevented from passing the trigger input signal to the regenerating multivibrator MV–1 and the input signal is blanked from the indicating system.

To summarize, the above described steady signal selector is outstanding over the prior art from the standpoints of versatility and design. The blanking generator in which the steady signal selector is incorporated is only one of many systems in which the above described periodic signal selector may be used.

Therefore, it is to be understood, that the modifications shown and described herein are not to be taken as specific limitations to the scope of this invention but only as examples of the versatility and many uses of the invention.

I claim:

1. A periodic signal selector comprising, an input signal pulse source, an input gate, a delay unit connected to the output of said input gate, a selecting pulse signal generating means at the output end of said delay unit, an error detecting gate connected to the output of said selecting pulse generating means, second delay means connected between the output side of said input gate and the input side of said error detecting gate, feedback control means between the output side of said error detecting gate and said delay unit for controlling the width of the signal pulses generated thereby, and an output gate connected directly to said input signal source and the output of said selecting signal generating means whereby, upon coincidence between said input signal pulse and said selecting pulse, an output pulse is emitted through said output gate.

2. A periodic signal selector as described in claim 1, wherein said feedback control means comprises a detector for generating an error signal at the output side of said selecting pulse generator and a feedback amplifier stage at the output of said detector.

3. In a periodic signal selector, in combination, an input gate, a selecting signal generating means, delay means connected between said input gate and said selecting signal generating means, and a negative pulse feedback from said delay means to said input gate whereby said delay means may not be retriggered until its initial cycle of operation has been completed.

4. An equipment indicating system comprising, in combination, an input pulse source, a gated input amplifier stage responsive to a particular trigger input from said input pulse source, a source of video pulses responsive to spurious echoes from interfering video equipments, a periodic signal selector, said periodic signal selector comprising an input gate, a delay unit connected to the output of said input gate, a selecting pulse signal generating means at the output end of said delay unit, an error detecting gate connected to the output of said selecting pulse generating means, second delay means connected between the output side of said input gate and the input side of said error detecting gate, feedback control means between the output side of said error detecting gate of said delay unit for controlling the width of the signal pulses generated thereby, and an output gate connected directly to said input signal source and the output of said selecting signal generating means, whereby, upon coincidence between said input signal pulse and said selecting pulse, an output pulse is emitted through said output gate, a blanking pulse signal generating means responsive to the outputs of said video pulse source and said periodic signal selector for generating blanking pulses to control the gain of said gated input amplifier in response to a particular trigger input thereto, a trigger input regenerating means across the output of said gated input amplifier and an indicator controlled by the output of said trigger input regenerating means.

5. An equipment indicating system comprising, in combination, an input pulse source, a gated input amplifier stage responsive to a particular trigger input from said input pulse source, a source of video pulses responsive to spurious echoes from interfering video equipments, a periodic signal selector, said periodic signal selector comprising a delay unit, a selecting signal generating means, an error detecting gate, said selective signal generating means being connected between said delay unit and said error detecting gate and a feedback control means connected between said error detecting gate and said delay unit whereby an input signal and the selecting signal generated by said selecting signal generating means, may be brought into coincidence, a blanking pulse signal generating means responsive to the outputs of said video pulse source and said periodic signal selector for generating blanking pulses to control the gain of said gate input amplifier in response to a particular trigger input thereto, a trigger input regenerating means across the output of said gated input amplifier and an indicator controlled by the output of said trigger input regenerating means.

6. An equipment indicating system comprising, in combination, an input pulse source, a gated input amplifier stage responsive to a particular trigger input from said input pulse source, a source of video pulses responsive to spurious echoes from interfering video equipments, a periodic signal selector, said periodic signal selector comprising an input gate, a selecting signal generating means, delay means connected between said input gate and said selecting signal generating means, and a negative pulse feedback from said second delay means to said input gate whereby said second delay means may not be retriggered until its initial cycle of operation has been completed, a blanking pulse signal generating means responsive to the outputs of said video pulse source and said periodic signal selector for generating blanking pulses to control the gain of said gated input amplifier in response to a particular trigger input thereto, a trigger input regenerating means across the output of said gated input amplifier and an indicator controlled by the output of said trigger input regenerating means.

7. An equipment indicating system comprising, in combination, an input pulse source, a gated input amplifier stage, a source of video pulses responsive to spurious echoes from interfering video equipments, a periodic signal selector, said periodic signal selector comprising a selecting signal generating means, delay means between said source of input signals and said selecting signal generating means and an output gate connected between said source of input signals and the output of said selecting signal generating means whereby an output signal is generated if said input signals and said selecting signals are coincident, a blanking pulse signal generating means responsive to the outputs of said video pulse source and said periodic signal selector for generating blanking pulses to control the gain of said gated input amplifier in response to a particular trigger input thereto, a trigger input regenerating means across the output of said gated input amplifier and an indicator controlled by the output of said trigger input regenerating means.

8. In a periodic signal selector in combination, a source of input pulses, a delay unit having a predetermined period of operation, a selecting signal generating means at the output side of said delay unit, an error detecting gate at the output side of said selecting signal generating means and a feedback control means connected between said error detecting gate and said delay unit and actuated by the output of said error detecting gate to change the period of operation of said delay unit whereby an input signal and the selecting signal generated by said selecting signal generating means may be brought into coincidence.

9. An equipment indicating system comprising, an input source, a gated input amplifier stage responsive to a particular trigger input from said input pulse source, a blanking generator for controlling the gain of said amplifier in response to a particular trigger input thereto, comprising a source of video pulses responsive to spurious echoes from interfering video equipments, a steady periodic signal selector responsive to steady periodic interference from said equipments, and a blanking pulse signal generating means responsive to the output of said source of video pulses for generating blanking pulses to prevent the passage of spurious echoes from interfering video equipments through said amplifier and responsive to the output of said periodic signal selector to prevent the passage of steady periodic signals through said amplifier, whereby said amplifier passes only those trigger input signals free from both spurious and steady interference, and an indicator connected across the output of said gated amplifier for displaying the unblanked portion of said trigger input passed through said amplifier.

References Cited in the file of this patent

UNITED STATES PATENTS

| | | |
|---|---|---|
| 2,233,317 | Konkle | Feb. 25, 1941 |
| 2,484,352 | Miller et al. | Oct. 11, 1949 |
| 2,562,450 | De Lano | July 31, 1951 |
| 2,577,827 | Tompkins | Dec. 11, 1951 |
| 2,648,766 | Eberhard | Aug. 11, 1953 |
| 2,759,180 | Wrenn | Aug. 14, 1956 |
| 2,776,424 | Lair et al. | Jan. 1, 1957 |
| 2,799,727 | Segerstrom | July 16, 1957 |
| 2,844,790 | Thompson et al. | July 22, 1958 |